United States Patent [19]

Emura et al.

[11] Patent Number: 4,620,619
[45] Date of Patent: Nov. 4, 1986

[54] VARIABLE-DAMPING-FORCE SHOCK ABSORBER

[75] Inventors: Junichi Emura, Ebina; Issei Kanari, Tokyo, both of Japan

[73] Assignee: Atsugi Motor Parts Co., Ltd., Japan

[21] Appl. No.: 463,334

[22] Filed: Feb. 2, 1983

[30] Foreign Application Priority Data

May 20, 1982 [JP] Japan .................................. 57-85548
Sep. 13, 1982 [JP] Japan .................................. 57-159117

[51] Int. Cl.⁴ ............................................. F16F 9/50
[52] U.S. Cl. .................................. 188/319; 188/282; 188/322.22; 188/299
[58] Field of Search ............... 188/319, 180, 182, 280, 188/299, 322.11, 322.22, 317, 282; 267/64.15; 91/422

[56] References Cited

U.S. PATENT DOCUMENTS

| | | | |
|---|---|---|---|
| 2,089,656 | 8/1937 | Magrum | 188/319 |
| 3,003,594 | 10/1961 | De Carbon | 188/317 |
| 3,763,970 | 10/1973 | Anderson | 188/282 |
| 3,827,538 | 8/1974 | Morgan | 188/299 |
| 4,313,529 | 2/1982 | Kato et al. | 188/299 |
| 4,419,804 | 12/1983 | Axthammer | 188/322.22 |

FOREIGN PATENT DOCUMENTS

| | | | |
|---|---|---|---|
| 1281865 | 10/1968 | Fed. Rep. of Germany | 188/319 |
| 0111064 | 8/1979 | Japan | 188/319 |
| 55-65741 | 5/1980 | Japan . | |
| 57-202034 | 12/1982 | Japan . | |
| 0944596 | 12/1963 | United Kingdom . | |
| 1061567 | 3/1967 | United Kingdom . | |
| 1393939 | 5/1975 | United Kingdom . | |
| 1515702 | 6/1978 | United Kingdom . | |
| 2036246 | 6/1980 | United Kingdom . | |
| 2100833 | 1/1983 | United Kingdom . | |
| 2111168 | 6/1983 | United Kingdom . | |

Primary Examiner—Duane A. Reger
Assistant Examiner—Robert J. Oberleitner
Attorney, Agent, or Firm—Lowe, Price, LeBlanc, Becker & Shur

[57] ABSTRACT

A variable-damping-force shock absorber such that the damping force determined through an orifice selected by an orifice adjuster according to the driver's preference can further automatically be increased during extension for improvement in road-holding ability and decreased during compression for improvement in riding comfort. The shock absorber according to the present invention comprises an annular member formed with an orifice and a disk valve disposed on top of the annular member. During extension, the disk valve is closed for allowing fluid to by-pass through an orifice of the annular member; during compression, the disk valve is opened for additionally allowing fluid to by-pass through the annular member. Further, since the various elements for adjusting the damping force are completely housed within the piston rod, it is possible to increase the stroke of the piston rod.

4 Claims, 10 Drawing Figures

| SELECT | ORIFICE | | E |
| --- | --- | --- | --- |
| | EXTENSION | COMPRESSION | |
| H | 12a(L) | 12a(L), 12a(U) | $E_1$ |
| M | 12b(L) | 12b(L), 12b(U) | $E_2$ |
| L | 12c(L) | 12c(L), 12c(U) | $E_3$ |
| MIN | 12d(L) | 12d(L), 12d(U) | $E_4$ |

D-D

E-E

VARIABLE-DAMPING-FORCE SHOCK ABSORBER

BACKGROUND OF THE INVENTION

1. Field of the Invention

The present invention relates generally to a shock absorber used for suspension systems of an automotive vehicle for absorbing vibration energy and more specifically to a shock absorber in which damping force can be adjusted automatically according to vehicle speed or manually according to the driver's preference.

2. Description of the Prior Art

When an automotive vehicle transverses a rough road, springs in the vehicle suspension system compress and expand to absorb shock. However, since the springs continue to vibrate until they return to their original state, the spring vibration reduces the road-holding ability and riding comfort of the vehicle. A shock absorber is used dampen on the spring vibration for insuring better road holding capability and better riding comfort. To obtain better riding comfort, a shock absorber generally provides greater damping action when extended than when compressed. This action is achieved by the use of valves which change the flow of fluid filled within the shock absorber. This double-acting shock absorber, which provides damping action during both extension and compression, is presently in common use on vehicles. Further, the faster the working speed of a piston employed in the shock absorber, the greater the damping force or damping action of the shock absorber. If the damping force is too great, a hard ride is obtained; if too soft, a soft ride is obtained.

In the conventional shock absorber, however, since the damping forces during both extenion and compression are usually fixed, the road-holding ability, the riding comfort, or the steering-wheel manipulability vary according to vehicle speed or road harshness.

To overcome the above-mentioned problems, there has been proposed a variable-damping-force hydraulic shock absorber provided with a motor, an adjuster, etc. in which part of working fluid within the upper and lower chambers is by-passed during operation through one of a plurality of orifices of various diameters selected by an orifice adjuster rotated with a motor. That is to say, since part of the amount of the working fluid through the upper and lower piston valves is diminished, a smaller damping force diminished from the conventional damping-force obtained by working fluid through only the valves can be obtained. In this case, the adjuster is controlled in response to a feedback signal detected by an angular position sensor attached thereto.

In such a prior-art variable-damping-force hydraulic shock absorber as described above, since part of working fluid displaceable passed between the two chambers is by-passed through the same orifice selected by the adjuster during both extension and compression, a variable amount of the damping force obtained in the extension mode of the piston is the same as that obtained in the compression mode, thus raising a further problem in that it is difficult to satisfy the above-mentioned request such that a shock absorber must provide greater damping action when extended than when compressed. In this connection, greater damping action during extension serves to improve the road-holding ability; while smaller damping action during compression serves to improve the riding comfort.

In shock absorbers for automotive vehicles, the total length of the absorber must be as short as possible from the standpoint of mounting space within the vehicle body, but the stroke of the piston rod must be as long as possible to absorb vibration energy (product of damping force and stroke). In the conventional variable-damping-force shock absorber, however, since additional space to mount various elements (provided with orifices through which the fluid is selectively by-passed) for adjusting damping force is inevitably required, the stroke of the piston rod becomes relatively short in the case where the total length of the shock absorber is fixed; that is, there exists another problem in that the stroke of the piston rod is not sufficiently long and therefore vibration energy is not sufficiently absorbed.

SUMMARY OF THE INVENTION

With these problems in mind, therefore, it is the primary object of the present invention to provide a variable-damping-force shock absorber for an automotive vehicle in which the damping force obtained through an orifice selected by an orifice adjuster according to the driver's preference can further automatically be changed according to the extension mode or the compression mode of the shock absorber. In more detail, the damping force is increased during extension for improvement in road-holding ability and is decreased during compression for improvement in riding comfort.

To achieve the above-mentioned object, the variable-damping-force shock absorber for an automotive vehicle according to the present invention comprises an annular member provided with an orifice and fixed to the orifice adjuster or the tubular member and a disk valve disposed on top of the annular member, in addition to various elements required for adjusting damping force according to vehicle speed or driver's preference. The disk valve is opened for allowing fluid to by-pass through the annular member (smaller damping force) when the piston rod moves downward during compression, and is closed for allowing fluid to by-pass through the orifice formed in the annular member (greater damping force) when the piston rod moves upward during extension.

It is an other object of the present invention to provide a variable-damping-force shock absorber for an automotive vehicle in which the damping force obtained through an orifice selected by the orifice adjuster according to the driver's preference can automatically be changed according to the extension mode or compression mode in such a construction as to provide a longest possible stroke of the piston rod in the case where the total length of the shock absorber is constant.

To achieve the above-mentioned object, in the variable-damping-force shock absorber for an automotive vehicle according to the present invention, there is further provided a larger orifice in the lower end wall of the piston rod in order to by-pass the fluid, flowing through the orifice selected by the orifice adjuster and the disk valve opened or closed according to compression or extension mode, from the upper chamber to the lower chamber or vice versa, and various elements for adjusting damping force are completely housed within the piston rod.

BRIEF DESCRIPTION OF THE DRAWINGS

The features and advantages of the variable-damping-force shock absorber for an automotive vehicle according to the present invention over the prior-art shock absorber will be more clearly appreciated from the following description of the preferred embodiments of the invention taken in conjunction with the accompanying drawings in which like reference numerals designate the same or similar elements and in which:

FIG. 3(B) is a table showing the relationships between damping force rates, upper and lower orifices, and reference signal levels;

DETAILED DESCRIPTION OF THE PREFERRED EMBODIMENTS

Figure 1:
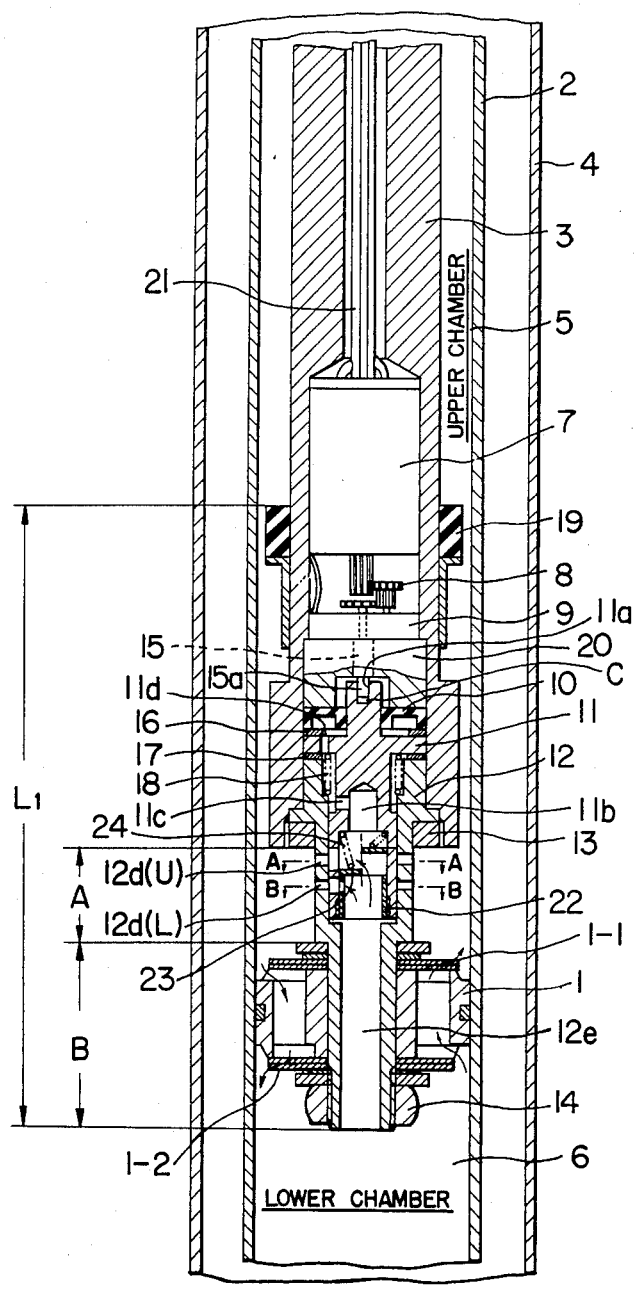
FIG. 1 is a cross-sectional view, partly side view, of the essential portion of a first embodiment of the variable-damping-force shock absorber according to the present invention.

Referring to FIG. 1, the shock absorber basically comprises a piston assembly 1 provided with two piston valves 1-1 and 1-2 and fitted into a cylinder 2 filled with a working fluid. A piston rod 3 is attached to the piston assembly 1 and is sealably and reciprocably inserted into the cylinder 2 through a packing (not shown) provided on top of the cylinder to prevent fluid leakage. On top of the piston rod 3 is a mounting eye (not shown) for installation to a car body (unsprung portion). The reference numeral 4 denotes an outer tube to providing a reservoir chamber for working fluid. The upper and lower chambers 5 and 6 inside the cylinder 2 are filled with working fluid and are connected to each other by means of the two piston valves 1-1 and 1-2. The lowermost part of the lower chamber 6 is connected to a reservoir provided between the outer periphery of the cylinder 2 and the inner periphery of the outer tube 4. The cylinder 2 has a mounting eye (not shown) at its lower end for connection to an axle (sprung portion).

When the piston assembly 1 moves downward and therefore the shock absorber operates in compression mode, working fluid in the lower chamber 6 flows into the upper chamber through the upper piston valve 1-1 to effect a desirable damping force. When the piston assembly 1 moves upward, and therefore the shock absorber operates in extension mode, working fluid in the upper chamber 5 flows into the lower chamber through the lower piston valve 1-2 to effect a damping force. However, the fluid cannot readily flow through the lower piston valve 1-2 because the valve 2 is designed to provide resistance. Thus, the flow resistance produced as a damping force during extension is greater than that during compression.

In addition to the basic elements described above, the variable-damping-force shock absorber according to the present invention comprises a motor 7 housed within a bored cavity of the piston rod 3, a reduction gear 8 made up of a train of gear wheels for reduction of revolution speed of the motor 7, an orifice adjuster postion sensor or a potentiometer 9, a shaft bearing 20, a sealing member 10, an orifice adjuster 11 rotatably connected to a driven shaft of the reduction gear 8 and provided with two upper and lower cutouts, and a tubular member 12 provided with a plurality of orifices of different diameters to which the piston assembly 1 is fixed, an annular member 22 fitted to the inner lower-end bore of the orifice adjuster 11 and provided with an orifice, and a disk valve 23.

To assemble the piston rod 3 of the shock absorber, first the disk valve 23 and the annular member 22 are fitted to the bore of the orifice adjuster 11 with a conical spring 24 disposed between the orifice adjuster 11 and the disk valve 23. Thereafter, these elements are fitted to the central hollow cavity of the piston rod 3 in the order of the motor 7, the reduction gear 8, the orifice adjuster position sensor 9, the shaft bearing 20, the sealing member 10, the orifice adjuster 11, and the tubular member 12, and then these elements are fixed together to the piston rod 3 by screwing a flat screw 13 into the threaded portion formed on the lower, inner circumferential surface of the piston rod 3. Further, the piston assembly 1 is fixed to the tubular member 12 by a nut 14.

Additionally, in FIG. 1, the reference numeral 15 denotes a driven shaft of the reduction gear 8, the end of which is formed into a roughly square shape 15a by, for instance, a milling machine and is engaged with a slot 11a formed on top of the orifice adjuster 11 with a clearance C provided therebetween in the axial direction thereof, in order to prevent the upward pressure of the orifice adjuster 11 from being directly applied to the driven shaft 15. Therefore, when the driven shaft rotates, torque is freely transmitted from the reduction gear 8 to the orifice adjuster 11 through the driven shaft 15a fitted to the slot 11a of the orifice adjuster 11.

The reference numerals 16 and 17 denote upper and lower thrust washers made of a material with a small friction coefficient. When the piston assembly 1 moves downward, since upward fluid pressure is applied to the orifice adjuster 11, the upper thrust washer 16 disposed between the sealing member 10 and the orifice adjuster 11 functions as a thrust bearing; on the other hand, when the piston assembly 1 moves upward, since downward fluid pressure is applied to the orifice adjuster 11, the lower thrust washer 17 disposed between the orifice adjuster 11 and the top end of the tubular member 12 functions as a thrust bearing.

The reference numeral 18 denotes a coil spring to urge the orifice adjuster 11 upward against the sealing member 10 when pressure within the cylinder is balanced.

The orifice adjuster 11 is formed with an upper central bore 11b, a side horizontal orifice 11c and a top vertical passage 11d. The tubular member 12 is formed with a central bore 12e. Therefore, the fluid pressure within the cylinder 2 is directly applied to the thrust washer 16 or 17 and the sealing member 10 by way of the central bore 12e of the tubular member 12, the central bore 11b of the orifice adjuster 11, the side horizontal orifice 11c, the space formed between the orifice adjuster 11 and the tubular member 12 for disposing the helical spring 18, and the top vertical passage 11d. Accordingly, the sealing member 10 is functioned to prevent fluid leakage on the position sensor side.

Further, the reference numeral 19 denotes a stopper for restricting the upward movement of the piston rod 3 within the cylinder 2, which is brought into contact with a packing (not shown) disposed at the uppermost position of the cylinder 2.

Figure 2A:
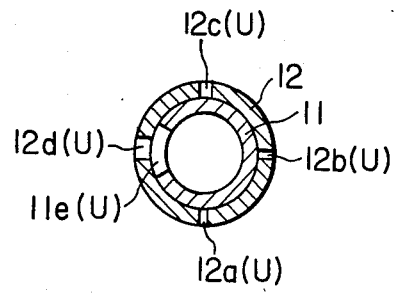
FIG. 2(A) is a fragmentary cross-sectional view taken along the line A—A shown in FIG. 1, in which there are illustrated one upper cutout formed in the orifice adjuster and four upper orifices formed in the tubular member.
Figure 2B:
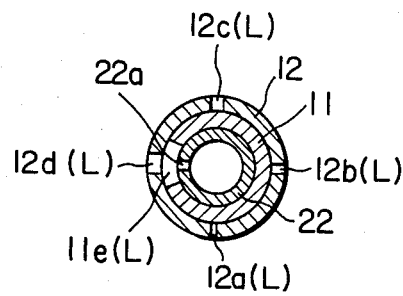
FIG. 2(B) is a fragmentary cross-sectional view taken along the line B—B shown in FIG. 1, in which there are illustrated one lower cutout formed in the orifice adjuster, four lower orifices formed in the tubular member, and an orifice formed in the annular member.

To adjust the damping force of the shock absorber, in the wall of the tubular member 12 there are radially formed four upper orifices 12a(U), 12b(U), 12c(U) and 12d(U) of different diameters being arranged at circumferentially spaced equal angular intervals (90 degrees), as depicted in FIG. 2(A) and four lower orifices 12a(L), 12b(L), 12c(L) and 12d(L) of different diameters being arranged in the same way, as depicted in FIG. 2(B). The diameter of the two first orifices 12a(U) and 12a(L) is the smallest; that of the two second orifices 12b(U) and 12b(L) is medium; that of the two third orifices 12c(U) and 12c(L) is also medium but greater than that of the second orifices; that of the two fourth orifices 12d(U) and 12d(L) is the largest, also as depicted in FIGS. 2(A) and 2(B). The four upper and lower orifices are arranged in two lines on the periphery of the tubular member.

Further, in the wall of the axial bore of the orifice adjuster 11, there are formed one upper cutout 11e(U) and one lower cutout 11e(L) near the lower end thereof, as also depicted in FIGS. 2(A) and 2(B). Furthermore, in the wall of the annular member 22 there is formed an orifice 22a in the radial direction thereof, as depicted in FIG. 2(B).

The annular member 22 is fixed to the inner bottom end of the bore of the orifice adjuster 11 in such a way that the orifice 22a can communicate with only the lower cutout 11e(L) formed in the orifice adjuster 11. The axial length of the annular member is so determined as not to close the upper cutout 11e(U) of the orifice adjuster.

The two cutouts 11e(U) and 11e(L) of the orifice adjuster 11 and the four upper orifices 12a(U) to 12d(U) and the four lower orifices 12a(L) to 12d(L) are so mutually arranged that when the orifice adjuster 11 is rotated by the driven shaft 15 and then stops at one of four predetermined angular positions, the upper cutout 11e(U) can communicate with any one of four upper orifices 12a(U) to 12d(U) and the lower cutout 11e(L) can communicate with any one of four lower orifices 12a(L) to 12d(L). As a result, the working fluid is by-passed by way of the central bore 12e, the orifice 22a, the lower cutout 11e(L) and any one of four lower orifices 12a(L) to 12d(L) and, additionally when the disk valve 23 is opened, the central bore 12e, the upper cutout 11e(U) and any one of four upper orifices 12a(U) to 12d(U), from the upper chamber to the lower chamber or vice versa.

In the case where the upper cutout 11e(U) and/or lower cutout 11e(L) communicates with the first upper orifice 12a(U) and/or first lower orifice 12a(L) (the smallest dia.), the greatest damping force will be obtained; where the upper cutout 11e(U) and/or lower cutout 11e(L) communicates with the second or third upper orifice 12b(U) or 12c(U) and/or the second or third lower orifice 12b(L) or 12c(L) (the medium dia.), the medium damping force will be obtained; where the upper cutout 11e(U) and/or the lower cutout 11e(L) communicates with the fourth upper orifice 12d(U) and/or the fourth lower orifice 12d(L) (the largest dia.), the smallest damping force will be obtained.

In addition to the orifice adjuster 11 and the tubular member 12, in this embodiment, there are further provided an annular member 22, a disk valve 23 and a conical spring 24, in order to further adjust the damping force of the shock absorber according to the extension mode or compression mode.

In more detail, when the piston moves upward, since pressure within the upper chamber 5 is higher than that within the lower chamber 6, the disk valve 23 is urged downward, so that the working fluid is by-passed only through the orifice 22a of the annular member 22, the lower cutout 11e(L) and any one of four lower orifices 12a(L) to 12d(L).

Accordingly, the greater damping force can be obtained in extension mode. In contrast with this, when the piston moves downward, since pressure within the upper chamber 5 is lower than that within the lower chamber 6, the disk valve 23 is urged upward against the elastic force of the conical spring 24, so that the working fluid is by-passed through the orifice 22a, the lower cutout 11e(L) and any one of four lower orifices 12a(L) to 12d(L) and additionally through the annular member 22, the upper cutout 11e(U) and any one of four upper orifices 12a(U) to 12d(U). Accordingly, the smaller damping force can be obtained in compression mode.

Here, it should be noted that the mass of the disk valve 23 must be as small as possible. If not, it is impossible to sufficiently adjust the damping force for each extension or compression, because up-and-down motion of the piston rod or the frequency of vibration to be absorbed is relatively high. The feature of this invention is to provide a smallest or lightest possible disk valve 23 at the center of the piston rod 3 for increasing sensitivity in response to change in pressure within the cylinder.

Further, in FIG. 1, the disk valve 23 urged downward when the piston 1 moves upward in extension mode is shown on the left side; the disk valve 23 urged upward when the piston 1 moves downward in compression mode is shown on the right side, separately in half.

Figure 3A:
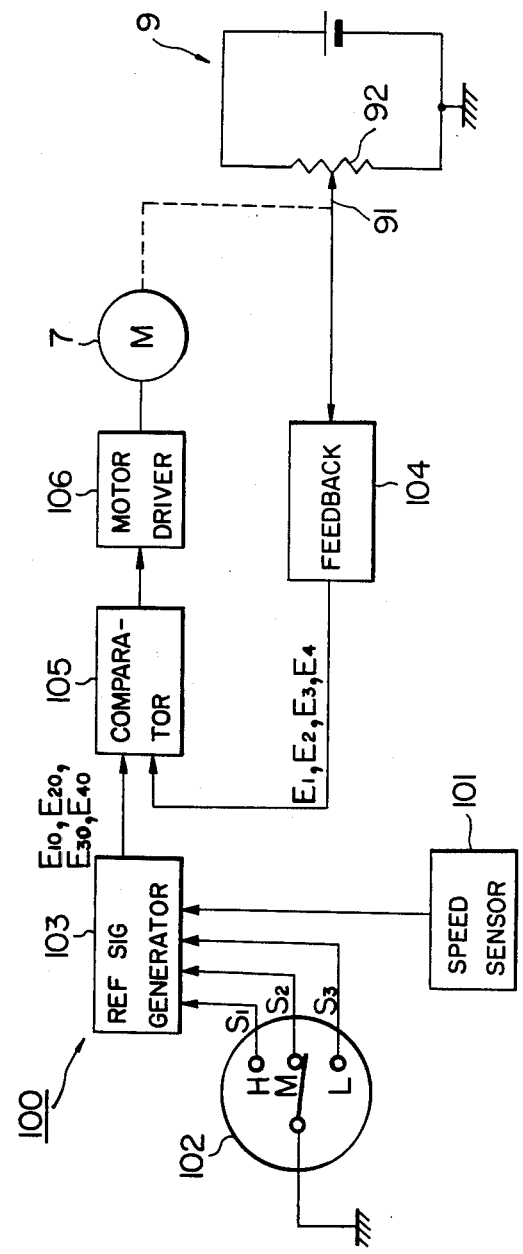
FIG. 3(A) is a schematic block diagram of a control unit used with the first embodiment of the variable-damping-force shock absorber according to the present invention, whereby the revolution angle of the orifice adjuster is feedback-controlled.

FIG. 3(A) shows a block diagram of the control unit 100 used with the variable-damping-force shock absorber according to the present invention.

In the figure, the reference numeral 101 denotes a speed sensor for outputting signals corresponding to the vehicle speed. The reference numeral 102 denotes a manual selector for selecting the rate of the damping of the shock absorber according to the driver's preference. When set to the L position, the lowest damping force can be obtained; when set to M position, the medium damping force can be obtained; when set to the H position, the highest damping force can be obtained. The reference numeral 103 denotes a reference signal generator for outputting a plurality of reference signals corresponding to the signals from the speed sensor 101 or the manual selector 102. The reference numeral 104 denotes a feedback unit for outputting position signals in response to the voltage levels outputted from the orifice adjuster position sensor 9. The reference numeral 105 denotes a comparator for comparing the reference signals from the reference signal generator 103 with the position signals from the feedback unit 104 and outputting a motor driving signal when both the signals do not match but no signal when both the signals match. The reference numeral 106 denotes a motor driver for outputting a power signal to drive the motor 7 in a predetermined direction.

In FIG. 3(A), the orifice adjuster position sensor 9 is a potentiometer provided with a slidable contact or a brush 91 and a circular pattern lead 92. The brush 91 is fixed to the driven shaft of the reduction gear 8 and rotated by the motor 7 together with the orifice adjuster 11. The circular pattern lead 92 made of a resistive material is fixed, both the ends of which are connected across a supply voltage. Therefore, when the driven shaft 15 of the reduction gear 8 is rotated by the motor together with the orifice adjuster 11, the brush 91 slides on the pattern lead 92, generating a potential proportional to the angular position of the contact point between the brush 91 and the pattern lead 92; that is, to the angular position of the orifice adjuster.

Now, follows description of operation of the variable-damping-force shock absorber according to the present invention.

When the driver sets the manual selector 102 to, for instance, the medium position M, the manual selector 102 outputs a second signal $S_2$ for selecting the medium damping force to the reference signal generator 103, so that the generator 103 outputs a second reference signal whose voltage level is $E_{20}$ to the comparator 105. In this case, if the feedback unit 104 is outputting a signal whose voltage level is different from that $E_{20}$ corresponding to the second signal $S_2$, the comparator 105 outputs a motor driving signal to the motor 7 via the motor driver 106. Therefore, the motor 7 rotates in the predetermined direction. When the motor 7 rotates and therefore the brush 91 reaches a position where a voltage level of $E_2$ is produced from the feedback unit 104, since this voltage level $E_2$ is inputted to the comparator 105, both the input signal levels $E_{20}$ and $E_2$ match, so that the comparator 105 stops outputting a motor driving signal to the motor 7. In this case, since the orifice adjuster 11 is so arranged that the upper and lower cutouts 11e(U) and 11e(L) communicate with the second upper and lower orifices 12b(U) and 12b(L) (medium dia.) of the tubular member 12, it is possible to obtain the medium damping force. In this situation, when the piston moves upward, pressure within the upper chamber 5 is higher than that within the lower chamber 6, so that the disk valve 23 is urged downward. Therefore, the working fluid is by-passed only through the lower cutout 11e(L) and the second lower orifice 12b(L), with the result that the greater medium damping force can be obtained in extension mode. In contrast with this, when the piston moves downward, pressure within the upper chamber 5 is lower than that within the lower chamber 6, so that the disk valve 23 is urged upward against the elastic force of the conical spring 24. Therefore, the working fluid is by-passed through the lower and upper cutouts 11e(L) and 11e(U) and the second lower and upper orifices 12b(L) and 12b(U), with the result that the smaller medium damping force can be obtained in compression mode. During both extension and compression, the working fluid is by-passed through the second orifice 12b(L) and/or 12b(U) and the cutout 11e(L) and/or 11e(U), in addition to the damping force obtained by the conventional damping-force generating means including the upper and the lower piston valves 1-1 and 1-2. The upper piston valve allows the fluid to flow from the lower chamber 6 to the upper chamber 5 when the piston 1 moves downward in compression mode; the lower piston valve allows the fluid to flow from the upper chamber 5 to the lower chamber 6 when the piston 1 moves upward in extension mode.

When the driver sets the manual selector 102 from the medium position M to the high position H the selector 102 outputs a first signal $S_1$ for selecting the high damping force to the reference signal generator 103, so that the generator 103 outputs a first reference signal whose voltage level is $E_{10}$ to the comparator 105. In this case, since the feedback unit 104 is outputting a signal whose voltage level is $E_2$ corresponding to the second signals $S_2$, the comparator 105 outputs a motor driving signal to the motor 7 via the motor driver 106. Therefore, the motor 7 rotates in the predetermined direction. When the motor 7 rotates and therefore the brush 91 reach a position where a voltage level of $E_1$ is produced from the feedback unit 104, since this voltage level $E_1$ is inputted to the comparator 105, both the input signal levels $E_{10}$ and $E_1$ match, so that the comparator 105 stops outputting a motor driving signal to the motor 7. In this case, since the orifice adjuster 11 is so arranged that the upper and lower cutouts 11e(U) and 11e(L) communicate with the first upper and lower orifices 12a(U) and 12a(L) (small dia.) of the tubular member 12, it is possible to obtain the high damping force. In this situation, when the piston moves upward, since the disk valve 23 is urged downward, the working fluid is by-passed only through the lower cutout 11e(L) and the first lower orifice 12a(L), with the result that the greater high damping force can be obtained in extension mode. In contrast with this, when the piston moves downward, since the disk valve 23 is urged upward against the elastic force of the conical spring 24, the working fluid is by-passed through the lower and upper cutouts 11e(L) and 11e(U) and the first lower and upper orifices 12a(L) and 12a(U), with the result that the smaller high damping force can be obtained in compression mode. During both extension and compression, the working fluid is by-passed through the first orifice 12a(L) and/or 12a(U) and the cutout 11e(L) and/or 11e(U), in addition to the damping force obtained by the conventional damping force generating means.

In the same way, when the manual selector 102 is set to the low position L, the selector 102 outputs a third signal $S_3$ for selecting the low damping force to the reference signal generator 103. When the motor 7 rotates and therefore the brush 91 reaches a position where a voltage level of $E_3$ is produced from the feedback unit 104, since this voltage level $E_3$ is inputted to the comparator 105, both the input signal levels $E_{30}$ and $E_3$ match. When the motor 7 stops, since the orifice adjuster 11 is so arranged that the upper and lower cutouts 11e(U) and 11e(L) communicate with the third upper and lower orifices 12c(U) and 12c(L) of the tubular member 12, it is possible to obtain the low damping force. In the situation, when the piston moves upward, the greater low damping force can be obtained in extension mode. In contrast with this, when the piston moves downward, the smaller low damping force can be obtained in compression mode.

In addition to the above-mentioned manual damping force selector 102, there is provided the speed sensor 101 in this embodiment. The speed sensor 101 serves to automatically shift the damping forces selected by the manual selector 102 according to vehicle speed.

When vehicle speed exceeds, for instance, 80 km/h, the speed sensor 101 outputs a positive speed signal indicative of high speed. In response to this speed signal, the second reference voltage level $E_2$ (medium damping force) is shifted to the first reference voltage level $E_1$ (high damping force) or the third reference voltage level $E_3$ (low damping force) is shifted to the second reference voltage level $E_2$ (medium damping force), automatically, in the reference signal generator 103.

On the other hand, when the vehicle speed drops below, for instance, 30 km/h, the speed sensor 101 outputs a negative speed signal indicative of low speed. In response to this speed signal, the first reference voltage level $E_1$ (high damping force) is shifted to the second reference voltage level signal $E_2$ (medium damping force) or the second reference level $E_2$ (medium damping force) is shifted to the third reference voltage level $E_3$ (low damping force) or the third reference level $E_3$ (low damping force) is shifted to the fourth reference voltage level $E_4$ (the lowest damping force), automatically, in the reference signal generator 103.

If the speed sensor 101 outputs a negative speed signal to the reference signal generator 103 when the manual selector 102 is set at the low position L, the generator 103 outputs a fourth reference signal whose voltage level is $E_4$ to the comparator 105. In this case, since the feedback unit 104 is outputting a signal whose voltage level is $E_3$ corresponding to the third signal $S_3$, the comparator 105 outputs a motor driving signal to the motor 7 via the motor driver 106. Therefore, the motor 7 rotates in the predetermined direction. When the motor 7 rotates and therefore the brush 91 reaches a position where a voltage level of $E_4$ is produced from the feedback unit 104, since this voltage level $E_4$ is inputted to the comparator 105, both the input signal levels $E_{40}$ and $E_4$ match, so that the comparator 105 stops outputting a motor driving signal to the motor 7. In this case, since the orifice adjuster 11 is so arranged that the upper and lower cutouts 11e(U) and 11e(L) communicates with the fourth upper and lower orifices 12d(U) and 12d(L) of the tubular member 12, it is possible to obtain the minimum damping force. In this situation, similarly, when the piston moves upward, the greater minimum damping force can be obtained in extension mode. In contrast with this, when the piston moves downward, the smaller minimum damping force can be obtained in compression mode.

The above-mentioned relationships between damping force rates (H, M, L, MIN), upper and lower orifices 12a(L) and 12a(U), 12b(L) and 12b(U), 12c(L) and 12c(U) and 12d(L) and 12d(U), and reference signal levels ($E_1$, $E_2$, $E_3$ and $E_4$) are listed in FIG. 3(B) for assistance in understanding of these mutual relationships.

Description has been made of the case where the speed sensor 101 outputs two positive and negative vehicle speed signals when vehicle speed exceeds 80 km/h and drops below 30 km/h. However, it is of course possible to output a plurality of positive or negative vehicle speed signals to shift the damping force whenever vehicle speed exceeds or drops below two or more different predetermined vehicle speeds. Further, it is also possible to output a single positive or negative vehicle speed signal to shift the damping force only when vehicle speed exceeds or drops below a predetermined vehicle speed.

Figure 4:
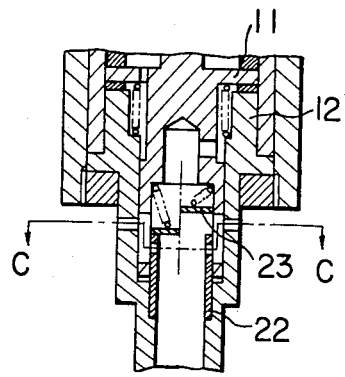
FIG. 4 is a fragmentary cross-sectional view of the essential portion of a second embodiment of the variable-damping-force shock absorber according to the present invention.

FIG. 4 shows a second embodiment of the variable-damping-force shock absorber according to the present invention.

Figure 5:
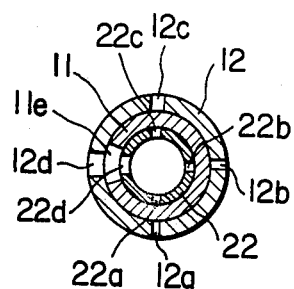
FIG. 5 is a fragmentary cross-sectional view taken along the line C—C shown in FIG. 4, of a cutout formed in the orifice adjuster, four orifices formed in the tubular member and four orifices formed in the annular member.

In this second embodiment, the upper and lower cutouts 11e(U) and 11e(L) formed in the orifice adjuster 11 in the first embodiment are connected to each other as a common cutout or slot 11e, and similarly the four upper and lower orifices 12a(U) and 12a(L), 12b(U) and 12b(L), 12c(U) and 12c(L) and 12d(U) and 12d(L) of the tubular member 12 are also connected to each other as four common orifices or slots 12a, 12b, 12c and 12d, as depicted in FIGS. 4 and 5. Further, the annular member 22 is fixed to the tubular member 12 (in the first embodiment, fixed to the orifice adjuster 11) having four orifices 22a, 22b, 22c and 22d of different diameters, in such a way that these four orifices 22a to 22d corresponds to the four orifices 12a, 12b, 12c and 12d of the tubular member 12 in number and in position and further the diameters of the four orifices 22a to 22d are a little smaller than those of four orifices 12a to 12d of the tubular member 12 corresponding thereto, respectively. Therefore, the diameter of the first orifice 22a of the annular member 22 is the smallest; that of the second orifice 22b thereof is medium; that of the third orifice 22c thereof is also medium but greater than that of the second orifice; that of the fourth orifice 22d thereof is the largest.

Further, the axial length of the annular member 22 is so designed that the top end thereof extends approximately to the middle of the cutout (slot) 11e of the orifice adjuster 11.

When the piston moves upward, since pressure within the upper chamber 5 is higher than that within the lower chamber 6, the disk valve 23 is urged downward, so that the working fluid is by-passed through any one of the orifices 22a to 22d of the annular member 22, the cutout 11e of the orifice adjuster 11, and any one of the orifices 12a to 12d of the tubular member 12, with the result that the greater damping force can be obtained in extension mode. In contrast with this, when the piston moves downward, since pressure within the upper chamber 5 is lower than that within the lower chamber 6, the disk valve 23 is urged upward against the elastic force of the conical spring 24, so that the working fluid is by-passed through the clearance formed between the disk valve 23 and the top of the annular member 22, in addition to the passageway obtained when the valve disk 23 is urged downward, with the result that the smaller damping force can be obtained in compression mode.

Further, similarly to FIG. 1, the disk valve 23 urged downward when the piston 1 moves upward in extension mode is shown on the left side; the disk valve 24 urged upward when the piston 1 moves downward in compression mode is shown on the right side, separately in half.

Figure 6:
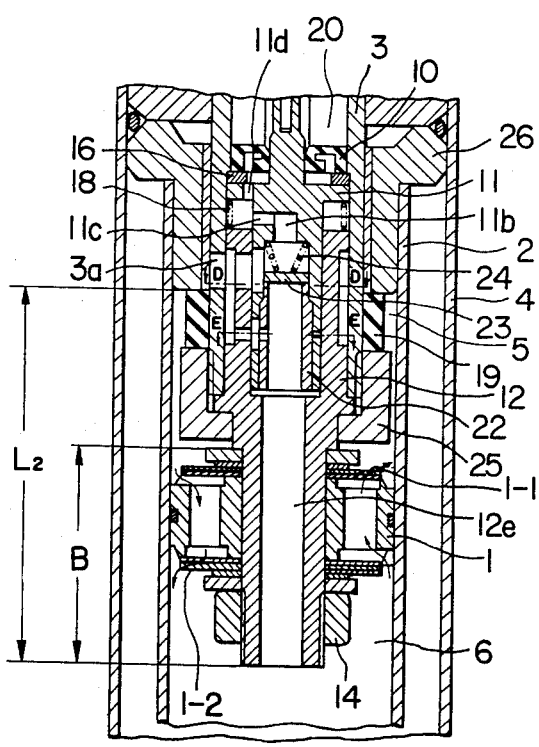
FIG. 6 is a cross-sectional view of the essential portion of a third embodiment of the variable-damping-force shock absorber according to the present invention.

FIG. 6 shows a third embodiment of the variable-damping-force shock absorber for an automotive vehicle according to the present invention.

In the shock absorber, the total length of the shock absorber is required to be as short as possible from the standpoint of mounting space to a car body, but the stroke of the piston rod is required to be as long as possible from the standpoint of increase in the absorption of vibration energy (product of damping force and stroke).

One of the major problems in realizing a variable-damping-force shock absorber for an automotive vehicle is that it is difficult to increase the stroke of piston rod. This is because an axial space is required for housing the additional elements for by-passing the working fluid.

To explain in greater detail with reference to FIG. 1, wehn the piston rod 3 moves to the uppermost position, the stopper 19 is brought into contact with the guide member to guide the piston rod (not shown). In this state, the bottom end of the tubular member 12 stops an axial length $L_1$ away from the top end of the stopper 19, as depicted in FIG. 1. The dimension B may be necessary to house the piston assembly; however, the dimension A is an additional one required to house the elements for by-passing the working fluid.

Therefore, it is a further object of the present invention to eliminate this dimension A to house the elements for by-passing the working fluid.

The construction of the third embodiment of the variable-damping-force shock absorber for an automotive vehicle according to the present invention will be described hereinbelow with reference to FIG. 6.

The shock absorber basically comprises a piston assembly 1 provided with two piston valves 1-1 and 1-2 and fitted into a cylinder 2 filled with a working fluid. A piston rod 3 is attached to the piston assembly 1 and is sealably and reciprocably inserted into the cylinder 2 through a guide member 26 and a packing member (not shown) to prevent leakage each provided on top of the cylinder. On top of the piston rod 3, there is provided a mounting eye (not shown) for installation to a car body (unsprung portion). The reference numeral 4 denotes an outer tube to provide the reservoir chamber of the working fluid within inner side thereof. The upper and lower chambers 5 and 6 inside the cylinder 2 are filled with the working fluid and are connected to each other by means of two piston valves 1-1 and 1-2. The lowermost part of the lower chamber 6 is connected to a reservoir which provided between outer periphery of the cylinder 2 and inner periphery of the outer tube 4. The cylinder 2 has a mounting eye (not shown) at its lower end for connection to an axle (sprung portion).

In addition to the basic elements described above, the variable-damping-force shock absorber according to the present invention comprises a motor (not shown), a reduction gear (not shown) made up of a train of gear wheels for reduction of revolution speed of the motor, an orifice adjuster position sensor or a potentiometer (not shown), a shaft bearing 20, a sealing member 10, an orifice adjuster 11 rotatably connected to a driven shaft of the reduction gear 8 and provided with two cutouts, a tubular member 12 provided with a plurality of orifices of different diameters to which the piston assembly 1 is fixed, an annular member 22 fitted to the lower inner hollow cavity of the orifice adjuster 11 and provided with a cutout and a disk valve disposed on top of the annular member 22.

Further, in FIG. 6, the reference numeral 19 denotes a stopper for restricting the uppermost position of the piston rod 3; the reference numeral 25 denotes a fixing member for fixing the various elements to the piston rod 3.

To assemble the piston rod 3 of the shock absorber, first the disk valve 23 and the annular member 22 are fitted to the bore of the orifice adjuster 12 with a conical spring 24 disposed between the orifice adjuster 11 and the disk valve 23. Thereafter, these elements are fitted to the central hollow cavity of the piston rod 3 in the order of the motor, the reduction gear, the orifice adjuster position sensor, the shaft bearing 20, the sealing member 10, the orifice adjuster 11 and the tubular member 12, and then these elements are fixed together to the piston rod 3 by screwing the fixing member 25 into the thread portion formed on the lowermost outer circumferential portion of the piston rod 3, after pressure-fitting the stopper 19 to the outer circumference of the piston rod 3. Further, the piston assembly 1 is fixed to the tubular member 12 by a nut 14.

Further, the reference numeral 16 denotes a thrust washer made of a material with a small friction coefficient. When the piston assembly 1 moves downward, since upward fluid pressure is applied to the orifice adjuster 11, the thrust washer 16 disposed between the sealing member 10 and the orifice adjuster 11 functions as a thrust bearing. The reference numeral 18 denotes a helical spring to always urge the orifice adjuster 11 upward against the sealing member 10 even if pressure within the cylinder drops.

The orifice adjuster 11 is formed with an upper central bore 11b, a side horizontal passage 11c and a top vertical passage 11d. The tubular member 12 is formed with a central bore 12e. Therefore, the fluid pressure within the cylinder 2 is directly applied to the thrust washer 16 and the sealing member 10 by way of the central bore 12e of the tubular member 12, the central bore 11b of the orifice adjuster 11, the side horizontal passage 11c, the space formed between the orifice adjuster 11 and the tubular member 12 for disposing the coil spring 18, and the top vertical passage 11d. Accordingly, the sealing member 10 functions to prevent fluid leakage.

Figure 7A:
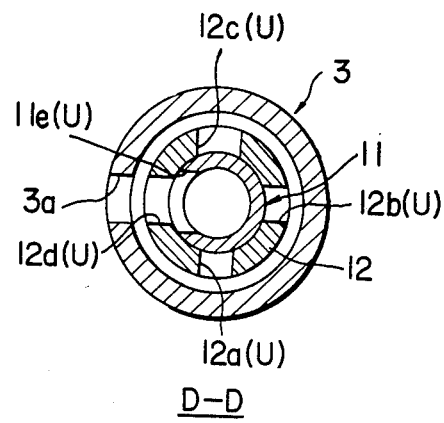
FIG. 7A is a fragmentary cross-sectional view taken along the line D—D shown in FIG. 6, a cutout formed in the orifice adjuster, four orifices formed in the tubular member, and one orifice formed in the piston rod.
Figure 7B:
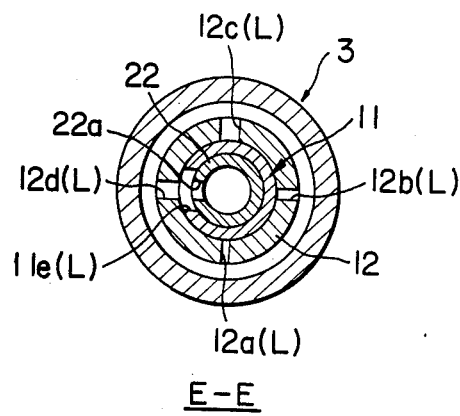
FIG. 7(B) is a fragmentally cross-sectional view taken along the line E—E shown in FIG. 6, in which one cutout is formed in the orifice adjuster, four orifices formed in the tubular member, and one orifice formed in the annular member.

To adjust the damping force of the shock absorber, in the wall of the piston rod 3 there is formed a large orifice 3a in the radial direction thereof near the top end surface of the stopper 19 as depicted in FIG. 7(A). In the wall of the tubular member 12 there are formed four upper orifices 12a(U), 12b(U), 12c(U) and 12c(U) of different diameter in the radial directions thereof as depicted in FIG. 7(A) and four lower orifices 12a(L), 12b(L), 12c(L) and 12c(L) of different diameters in the axial directions thereof as depicted in FIG. 7(B). The diameter of the two first orifice 12a(U) and 12a(L) is the smallest; that of the two second orifice 12b(U) and 12b(L) is medium; that of the two third orifice 12c(U) and 12c(L) is also medium but greater than that of the second orifice; that of the two fourth lower orifice 12d(U) and 12d(L) is the largest, being arranged counterclockwise at circumferentially spaced equal angular intervals (90 degrees). Further, in the wall of the orifice adjuster 11 there are formed one upper cutout 11e(U) and one lower cutout 11e(L) smaller than the upper one as depicted in FIGS. 7(A) and 7(B). Furthermore, in the wall of the annular member 22 there is formed an orifice 22a in the radial direction thereof, as depicted in FIG. 7(B).

The annular member 22 is fixed to the inner bottom end of the bore of the orifice adjuster 11 in such a way that the orifice 22a can communicate with only the lower cutout 11e(L) formed in the orifice adjuster 11. The axial length of the annular member is so determined as not to close the upper cutout 11e(U) of the orifice adjuster.

The two cutouts 11e(U) and 11e(L) of the orifice adjuster 11 and the four upper orifices 12a(U) to 12d(U) and the four lower orifices 12a(L) to 12d(L) are so mutually arranged that when the orifice adjuster 11 is rotated by the motor and the stops at one of four predetermined angular positions, the upper cutout 11e(U) can communicate with any one of four upper orifices 12a(U) to 12d(U) and the lower cutout 11e(L) can communicate with any one of four lower orifices 12a(L) to 12d(L).

As a result, the working fluid is by-passed by way of the central bore 12e, the orifice 22a, the lower cutout 11e(L), any one of four lower orifices 12a(L) to 12a(L), and the large orifice 3a and additionally by way of (when the disk valve 23 is opened) the central bore 12e, the upper cutout 11e(U) and any one of four upper orifices 12a(U) to 12d(U) and the large orifice 3a, from the upper chamber to the lower chamber or vice versa.

In the case where the upper cutout 11e(U) and/or the lower cutout 11e(L) communicates with the first upper orifice 12a(U) and/or the first lower orifice 12a(L) (the smallest dia.), the greatest damping force will be obtained; where the upper cutout 11e(U) and/or lower cutout 11e(L) communicates with the second or third lower orifice 12b(U) or 12c(U) and/or the second or third lower orifice 12b(L) or 12c(L) (the medium dia.), the medium damping force will be obtained; where the lower cutout 11e(U) and/or the lower cutout 11e(L) communicates with the fourth lower orifice 12d(U) and/or the fourth lower orifice 12d(L) (the largest dia.), the smallest damping force will be obtained.

In addition to the orifice adjuster 11 and the tubular member 12, there are further provided a disk valve 23 and a conical spring 24, in order to further adjust the damping force of the shock absorber according to the extension mode or compression mode.

In more detail, when the piston moves upward, since pressure within the upper chamber 5 is higher than that within the lower chamber 6, the disk valve 23 is urged downward, so that the working fluid is by-passed only through the orifice 22a of the annular member 22, the lower cutout 11e(L), any one of four lower orifices 12a(L) to 12d(L), and the larger orifice 3a. Accordingly, the greater damping force can be obtained in extension mode. In contrast with this, when the piston moves downward, since pressure within the upper chamber 5 is lower than that within the lower chamber 6, the disk valve 23 is urged upward against the elastic force of the conical spring 24, so that the working fluid is by-passed through the orifice 22a, the lower cutout 11e(L), any one of four lower orifices 12a(L) to 12d(L) and the larger orifice 3a and additionally through the upper cutout 11e(U), any one of four upper orifices 12a(U) to 12d(U) and the larger orifice 3a. Accordingly, the smaller damping force can be obtained in compression mode.

In summary, in this third embodiment shown in FIG. 6, the annular member 22, the orifice adjuster 11, and the tubular member 12 are completely housed within the hollow cavity of the piston rod 3 and there is additionally provided a larger orifice 3a in the wall of the piston rod 3 at the lowest position near the stopper 19. As depicted in FIG. 6, when the piston rod 3 stops at the uppermost position, since the larger orifice 3a is closed, it is impossible to by-pass the working fluid; however, when the piston rod 3 moves a little downward, since the larger orifice 3a is immediately opened, there will be no problem in actual use.

Therefore, in this third embodiment, it is possible to reduce the axial length $L_1$ shown in FIG. 1 to such an extent $L_2$ as shown in FIG. 6, eliminating the length A to house the elements for by-passing the working fluid. As a result, it is possible to provide the same extent of the stroke of the piston rod as that of the ordinary constant-damping-force shock absorber.

Since the absorbed vibration energy is defined by the product of stroke and damping force, the larger the stroke, the greater the vibration energy will be absorbed by the shock absorber. The shock absorber according to the present invention having a sufficient stroke of the piston rod can be used for a heavy automotive vehicle by increasing the damping force, as well as for a light automotive vehicle by decreasing the damping force, for improvement in riding comfort and road-holding ability.

Further, in this third embodiment, although only the case is described where upper and lower orifices are formed in the tubular member 12 and upper and lower cutouts are formed in the orifice adjuster 11, it is of course possible to apply the structure of this third embodiment to the case where only the lower orifices are formed in the tubular member 12 and only the lower cutout is formed in the orifice adjuster 11 as already described as the second embodiment of the present invention.

The operation of the third embodiment is almost the same as that in the first embodiment, therefor the description thereof being omitted herein.

As described above, in the variable-damping-force shock absorber according to the present invention, since an annular member and a disk valve are additionally provided for obtaining greater damping force during extension and smaller damping force during compression, it is possible to further improve riding comfort and road-holding ability.

Further, since the elements required for adjusting damping force are completely housed within the piston rod and an orifice is additionally formed at the lower end of the wall of the piston rod, it is possible to increase stroke of the piston rod without increasing the total length of the shock absorber and therefore to absorb greater vibration energy.

It will be understood by those skilled in the art that the foregoing description is in terms of preferred embodiments of the present invention wherein various changes and modifications may be made without departing from the spirit and scope of the invention, as set forth in the appended claims.

What is claimed is:
1. A variable-damping-force shock absorber, which comprises:
 (a) a cylinder filled with a viscous working fluid;

(b) a piston rod sealably and reciprocally inserted into said cylinder at one end thereof;

(c) a piston assembly slidably fitted to said cylinder so as to divide the housing of said cylinder into an upper chamber and a lower chamber, said piston assembly being provided with piston valves for restrictively allowing the working fluid to flow between the upper and lower chambers divided by said piston assembly when said piston assembly reciprocates within said cylinder;

(d) a tubular member having a lower end communicating with the lower chamber, said tubular member connecting said piston rod and said piston, said tubular member being provided with an upper and a lower set of orifices with each set having a plurality of orifices of different diameters communicating with the upper chamber and arranged radially symmetrically around said tubular member, said orifice sets being respectively located at axially spaced positions from each other along said tubular member;

(e) an orifice adjuster rotatably fitted to said tubular member, said adjuster being provided with an axial bore to communicate with the lower chamber and a pair of upper and lower cutouts formed in the wall of the axial bore to selectively communicate with any one of the upper and lower orifices formed in said tubular member, respectively;

(f) an annular member fixed to the axial bore of said orifice adjuster, and having an axial length so as to extend to cover the lower cutout formed in the wall of said orifice adjuster, said annular member being provided with at least one orifice communicating with the lower cutout formed in the wall of said orifice adjuster; and (g) a disk valve disposed at the upper end of said annular member, said valve being opened when said piston rod moves downward in compression mode to allow passage of working fluid through the upper and lower cutouts of the orifice adjuster and closed when said piston rod moves upward in extension mode to prevent passage of fluid through the upper cutout;

whereby part of the working fluid displaceably passing between the upper and lower fluid chambers by-passes (1) through the upper and lower cutouts of said orifice adjuster and the upper and lower orifices of said tubular member in the compression mode of the shock absorber to obtain a damping force F1 and (2) through only the lower cutout of said orifice adjuster and the lower orifice of said tubular member in extension mode of the shock absorber to obtain damping force F2 which is greater than force F1.

2. A variable-damping force shock absorber, which comprises:

(a) a cylinder filled with a viscous working fluid;

(b) a piston rod sealably and reciprocably inserted into said cylinder at one end thereof;

(c) a piston assembly slidably fitted to said cylinder so as to divide the housing of said cylinder into an upper chamber and a lower chamber, said piston assembly being provided with piston valves for restrictively allowing the working fluid to flow between the upper and lower chambers divided by said piston assembly when said piston assembly reciprocates within said cylinder;

(d) a tubular member having a lower end communicating with the lower chamber, said tubular member connecting said piston rod and said piston, said tubular member being provided with a set of orifices of different diameters communicating with the upper chamber and arranged radially symmetrically around said tubular member;

(e) an orifice adjuster rotatably fitted to said tubular member, said adjuster being provided with an axial bore to communicate with the lower chamber and at least one cutout formed in the wall of the axial bore thereof to selectively communicate with any one of the orifices formed in said tubular member;

(f) an annular member fixed to said tubular member, the axial length of which is so determined as to close part of the at-least one cutout formed in the wall of said orifice adjuster, said annular member being provided with a plurality of orifices corresponding to the orifices formed in said tubular member in number and angular position; and (g) a disk valve disposed at the upper end of said annular member, said valve being opened when said piston rod moves downward in compression mode and closed when said piston rod moves upward in extension mode to prevent passage of fluid through a part of said at least one cutout of the orifice adjuster that is not covered by the annular member;

whereby part of the working fluid displaceably passing between the two fluid chambers is by-passed through (1) the annular member, the cutout of said orifice adjuster and the orifice of said tubular member in the compression mode of thre shock absorber to obtain a damping force F1 and through (2) the orifice of said annular member, the cutout of said orifice adjuster and the orifice of said tubular member in the extension mode of the shock absorber to obtain damping force F2 that is greater than force F1.

3. A variable-damping-force shock absorber as set forth in either claim 1 or 2, wherein the orifice portion of said tubular member, the cutout portion of said orifice adjuster, said annular member, and said disk valve are all housed within said piston rod and the working fluid flowing through the orifice of said tubular member and the cutout of said orifice adjuster is by-passed through a large orifice formed at the lower end of the wall of said piston rod.

4. A hydraulic damper comprising:

a cylinder containing therein hydraulic liquid;

a piston slidable within said cylinder and partitioning the interior thereof into first and second chambers;

damping force generating means mounted on said piston for generating damping force in the extension and contraction strokes of the damper;

a piston rod connected to said piston and extending through one of said chambers to the exterior of said cylinder;

an internal chamber formed in said piston rod and directly communicating with said first chamber;

first and second by-pass passages by-passing said damping force generating means and connecting said second chamber with said internal chamber and thereby with said first chamber, each of said first and second by-pass passages comprising a plurality of openings of different cross-sectional area extending through said piston rod;

check valve means for preventing liquid flow through said first by-pass passage upon movement of said piston in one direction within said cylinder and for permitting liquid flow therethrough upon movement of said piston in the opposite direction;

said second by-pass passage being open to permit liquid flow therethrough during movement of said piston in both said directions; and adjusting valve means for selectively adjusting the effective passage area of both said first and second by-pass passages, said adjusting means comprising a valve member rotatably mounted in said piston rod, and means for rotating said valve member to open a selected at least one of said openings of each of said first and second by-pass passages.

* * * * *